United States Patent
Nagai et al.

(10) Patent No.: US 9,611,913 B2
(45) Date of Patent: Apr. 4, 2017

(54) DUST COVER ASSEMBLY

(71) Applicant: SUMITOMO RIKO COMPANY LIMITED, Komaki-shi, Aichi (JP)

(72) Inventors: Hiroaki Nagai, Komaki (JP); Hideo Yanagino, Konan (JP); Kouichi Kobayashi, Kasugai (JP)

(73) Assignee: SUMITOMO RIKO COMPANY LIMITED, Komaki (JP)

(*) Notice: Subject to any disclaimer, the term of this patent is extended or adjusted under 35 U.S.C. 154(b) by 0 days.

(21) Appl. No.: 14/706,559

(22) Filed: May 7, 2015

(65) Prior Publication Data
US 2015/0240903 A1 Aug. 27, 2015

Related U.S. Application Data

(63) Continuation of application No. PCT/JP2014/055338, filed on Mar. 3, 2014.

(30) Foreign Application Priority Data

Mar. 22, 2013 (JP) ................... 2013-059539

(51) Int. Cl.
*F16F 9/38* (2006.01)
*B60G 13/06* (2006.01)
(Continued)

(52) U.S. Cl.
CPC ................ *F16F 9/38* (2013.01); *B60G 13/06* (2013.01); *F16F 1/126* (2013.01); *F16J 3/042* (2013.01); *F16J 3/043* (2013.01)

(58) Field of Classification Search
CPC .............. B60G 15/062; B60G 15/1215; B60G 2202/312; B60G 2204/4308; B60G 11/52
(Continued)

(56) References Cited

U.S. PATENT DOCUMENTS 4,934,667 A * 6/1990 Pees ....................... B60G 11/64
188/322.17
5,176,390 A * 1/1993 Lallement ............... F16D 3/845
277/636
(Continued)

FOREIGN PATENT DOCUMENTS

JP H07-63236 A 3/1995
JP 2003-072338 A 3/2003
(Continued)

OTHER PUBLICATIONS

Sep. 22, 2015 International Preliminary Report on Patentability issued in International Patent Application No. PCT/JP2014/055338.
(Continued)

*Primary Examiner* — Christopher Schwartz
(74) *Attorney, Agent, or Firm* — Oliff PLC (57) ABSTRACT

A dust cover assembly including: a dust cover made of resin and having a bellows tube portion; and an upper insulator made of rubber attached to a top end of the dust cover. An engaging tube portion is integrally formed with an upper part of the bellows tube portion of the dust cover. At least one engaging groove opens onto an outer peripheral face of the engaging tube portion and extends in a circumferential direction. At least one locking protrusion is formed on an inner peripheral face of the upper insulator having an annular shape and protrudes toward an inner peripheral side, while extending in the circumferential direction. The engaging tube portion of the dust cover is inserted into the upper insulator, while the locking protrusion is inserted into the engaging groove and is locked therein in an axial direction.

7 Claims, 6 Drawing Sheets

(51) Int. Cl.
*F16J 3/04* (2006.01)
*F16F 1/12* (2006.01)

(58) Field of Classification Search
USPC ......... 188/322.16–322.18; 267/64.19, 64.21, 267/64.23, 64.24, 64.27, 33–35, 220, 221
See application file for complete search history.

(56) References Cited

U.S. PATENT DOCUMENTS

| | | | | |
|---|---|---|---|---|
| 5,954,168 | A * | 9/1999 | Nakatani | F16F 9/38 188/322.12 |
| 6,883,651 | B2 * | 4/2005 | Fukaya | B60G 11/14 188/322.12 |
| 8,657,270 | B2 * | 2/2014 | Takada | F16F 9/38 188/322.12 |
| 2002/0153646 | A1 * | 10/2002 | Weitzenhof | F16J 3/042 267/64.27 |
| 2002/0189441 | A1 | 12/2002 | Collis et al. | |
| 2015/0328947 | A1 * | 11/2015 | Kawahara | F16F 9/38 267/221 |

FOREIGN PATENT DOCUMENTS

| | | |
|---|---|---|
| JP | 2005-188548 A | 7/2005 |
| JP | 2007-032732 A | 2/2007 |

OTHER PUBLICATIONS

Jun. 3, 2014 International Search Report issued in PCT/JP2014/055338.
Jun. 27, 2016 Office Action issued in Japanese Patent Application No. 2013-059539.

* cited by examiner

DUST COVER ASSEMBLY

INCORPORATED BY REFERENCE

The disclosure of Japanese Patent Application No. 2013-059539 filed on Mar. 22, 2013 including the specification, drawings and abstract is incorporated herein by reference in its entirety. This is a Continuation of International Application No. PCT/JP2014/055338 filed on Mar. 3, 2014.

BACKGROUND OF THE INVENTION

1. Field of the Invention

The present invention relates to a dust cover to be mounted to a suspension mechanism and a dust cover assembly provided with an upper insulator.

2. Description of the Related Art

Conventionally, there has been known a dust cover that is externally fitted onto a shock absorber to cover the area around the protrusion of a piston rod and a dust cover assembly provided with an upper insulator that supports the top end of a coil spring. As the dust cover assembly, as disclosed in Japanese Unexamined Patent Publication No. JP-A-2003-072338 for example, there is a type with the dust cover and upper insulator integrally formed by a rubber elastic body.

By the way, the upper part of the dust cover is integrally connected to the upper insulator, and by having it supported by a piston rod, intrusion of foreign matters from above is prevented. Meanwhile, the lower part of the dust cover is loosely inserted into a cylinder with relative displacement freely allowed therein so that the effect of tensile force against the dust cover at the time of expansion of the shock absorber is avoided.

However, if the gap set between the bottom end of the dust cover and the cylinder is too large, there is a risk of intrusion of foreign matters such as water into the bottom opening of the dust cover to adhere to the piston rod. In addition, there is another risk that a bellows tube portion gets stuck in a state of contraction deformation so that the dust cover is unable to follow the expansion and contraction of the shock absorber.

Then, U.S. Pat. No. 5,954,168 proposes a structure where the bottom part of the dust cover is supported by a cylinder by means of, for example, locking it with a catch lock protruding from the cylinder. In such a structure, the dust cover follows the expansion and contraction of the shock absorber to be forced to undergo contraction deformation, which can exert a tensile force on the dust cover in the axial direction, so that it been studied to improve the durability of the dust cover by making it of resin.

However, if the dust cover is made of resin, it can no longer be formed integrally with the upper insulator that is formed with rubber elastic body for obtaining a buffer effect. In addition, it is difficult to get enough bonding strength by retrofitting the dust cover made of resin to the rubber-made upper insulator. Another idea is to provide the upper insulator with a metal fitting to support the top part of the dust cover, which had a risk of posing a problem with the increase in the weight and the number of parts.

SUMMARY OF THE INVENTION

The present invention has been developed in view of the above-described matters as the background, and it is an object of the present invention to provide a dust cover assembly with a novel structure where a dust cover made of resin and an upper insulator made of rubber are attached to each other in a simple manner with enough strength to be able to achieve excellent durability while effectively preventing intrusion of foreign matters.

The above and/or optional objects of this invention may be attained according to at least one of the following aspects of the invention. The following aspects and/or elements employed in each aspect of the invention may be adopted at any possible optional combinations.

A first aspect of the present invention provides a dust cover assembly comprising: a dust cover made of resin and configured to externally fit onto a shock absorber of a suspension mechanism, while including a bellows tube portion having peaks and valleys arranged in a linked manner, upper and lower sides of the bellows tube portion being configured to be supported by one and another of a piston rod and a cylinder of the shock absorber, respectively; and an upper insulator made of rubber and configured to support a top end of a coil spring of the suspension mechanism, the upper insulator being attached to a top end of the dust cover, wherein an engaging tube portion is integrally formed with an upper part of the bellows tube portion of the dust cover, at least one engaging groove opens onto an outer peripheral face of the engaging tube portion and extends in a circumferential direction, at least one locking protrusion is formed on an inner peripheral face of the upper insulator having an annular shape and protrudes toward an inner peripheral side, while extending in the circumferential direction, and the engaging tube portion of the dust cover is inserted into the upper insulator, while the locking protrusion is inserted into the engaging groove and is locked therein in an axial direction.

Using the dust cover assembly with the structure according to the first aspect, by having the dust cover formed of resin, enough durability is ensured even when the assembly substantially expands or contacts in the axial direction. Thus, it is possible to set the length of the assembly in the axial direction large enough to prevent intrusion of sand and dust from below. In addition, better durability than that of a rubber-made dust cover can be achieved even with a structure where both the upper and lower sides of the assembly are attached to the shock absorber to be forced to undergo expansion and contraction deformation following the expansion and contraction of the shock absorber.

Furthermore, by having the locking protrusion of the upper insulator inserted into the engaging groove of the engaging tube portion that is provided in the dust cover to be locked therein in the axial direction, the engaging tube portion of the resin-made dust cover is assembled to the rubber-made upper insulator in a state of being inserted therein so as to prevent any dislodgement in the axial direction. This enables to obtain the dust cover assembly by means of simply assembling the resin-made dust cover and the rubber-made upper insulator, which are difficult to bond together.

A second aspect of the present invention provides the dust cover assembly according to the first aspect, wherein the engaging groove includes an abutting part that regulates a moving edge of the locking protrusion within the engaging groove by abutting against the locking protrusion in the circumferential direction.

According to the second aspect, relative directional position between the dust cover and the upper insulator in the circumferential direction can easily be set to retain them in a particular directional position prescribed to resist external forces.

A third aspect of the present invention provides the dust cover assembly according to the first or second aspect, wherein the at least one engaging groove formed in the engaging tube portion comprises a plurality of engaging grooves that are spaced apart from each other vertically in the axial direction, while the at least one locking protrusion formed on the upper insulator comprises a plurality of locking protrusions that are spaced apart from each other vertically in the axial direction.

According to the third aspect, since the locking protrusions and engaging grooves provided at a plurality of locations along the axis are each locked in the axial direction, the engaging tube portion is prevented from dislodging from the upper insulator in a more effective way.

A fourth aspect of the present invention provides the dust cover assembly according to any one of the first through third aspects, wherein, in a formation part of the locking protrusion on the upper insulator, a protruding dimension (t) of the locking protrusion relative to a maximum thickness dimension (T) of the upper insulator including the locking protrusion in an axis-perpendicular direction is set in a range of $T/4 \leq t \leq 3T/4$.

According to the fourth aspect, since the locking protrusion and the engaging groove are abutted and locked against each other with a large area of abutment, the dust cover and the upper insulator are assembled together with a significant resistance to dislodgement, while, by securing enough rigidity against deformation of the upper insulator at a portion thereof that supports the locking protrusion, release of the locking between the locking protrusion and the engaging groove due to deformation of the upper insulator can be prevented.

A fifth aspect of the present invention provides the dust cover assembly according to any one of the first through fourth aspects, wherein the engaging tube portion of the dust cover is fitted into the upper insulator in a condition where the upper insulator is elastically deformed toward an outer periphery so as to be elastically brought in close contact with the engaging tube portion.

According to the fifth aspect, since the rubber-made upper insulator is brought in close contact with the engaging tube portion by its own elasticity so as to have the locking protrusion energized on the side of insertion into the engaging groove, the locking protrusion is prevented from dislodging from the engaging groove, thus more stably maintaining the condition of assembly between the dust cover and the upper insulator.

A sixth aspect of the present invention provides the dust cover assembly according to any one of the first through fifth aspects, wherein the upper insulator is configured such that a cylindrical metal fitting attached to the shock absorber is inserted and arranged therein, and the locking protrusion of the upper insulator is configured to be located on an outer peripheral side of the cylindrical metal fitting.

According to the sixth aspect, since the fitting portion between the engaging tube portion of the dust cover and the upper insulator are protected by the cylindrical metal fitting, abutment of the cylinder and the like against the fitting portion between the engaging tube portion and the upper insulator is prevented to keep the dust cover and the upper insulator in an assembled state.

A seventh aspect of the present invention provides the dust cover assembly according to any one of the first through sixth aspects, wherein the engaging tube portion of the dust cover is formed by blow molding at the inner peripheral side of the upper insulator so that the engaging tube portion is fitted to the inner peripheral face of the upper insulator while the locking protrusion is locked in the engaging groove in the axial direction during the molding of the engaging tube portion.

According to the seventh aspect, since the engaging tube portion of the dust cover and the upper insulator are fitted to each other at the time of forming the dust cover by blow molding, the assembly of the dust cover and the upper insulator is no longer needed, thus simplifying the manufacturing process. In addition, by having the engaging tube portion and the upper insulator brought in close contact with each other by air pressure at the time of blow molding, the locking protrusion and the engaging groove are fitted to each other in close contact, thus enabling to obtain a higher resistance to dislodgement of the dust cover.

An eighth aspect of the present invention provides the dust cover assembly according to the seventh aspect, wherein the upper insulator includes a protective piece configured to be sandwiched between a blow mold of the dust cover and a parison, which is a material for molding the dust cover, during the molding of the dust cover, and the protective piece is cut off after the molding of the dust cover.

According to the eighth aspect, when the parison is blown to form the dust cover, defective formation due to damages to the parison can be prevented by protecting the parison from being pressed against the corner of the blow mold using the protective piece. In addition, since the protective piece no longer needed after the completion of molding is cut off, the protective piece will not be in the way in the process of mounting the upper insulator to the suspension mechanism.

According to the present invention, the engaging tube portion of the dust cover is inserted into the upper insulator, while the locking protrusion formed on the inner peripheral face of the upper insulator is inserted into the engaging groove formed on the outer peripheral face of the engaging tube portion, and the engaging groove and the locking protrusion are locked to each other in the axial direction. This allows the resin-made dust cover to be mounted to the rubber-made upper insulator in a simple manner with high fixing strength, which makes it possible to adopt a resin-made dust cover with excellent durability.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

Figure 1:
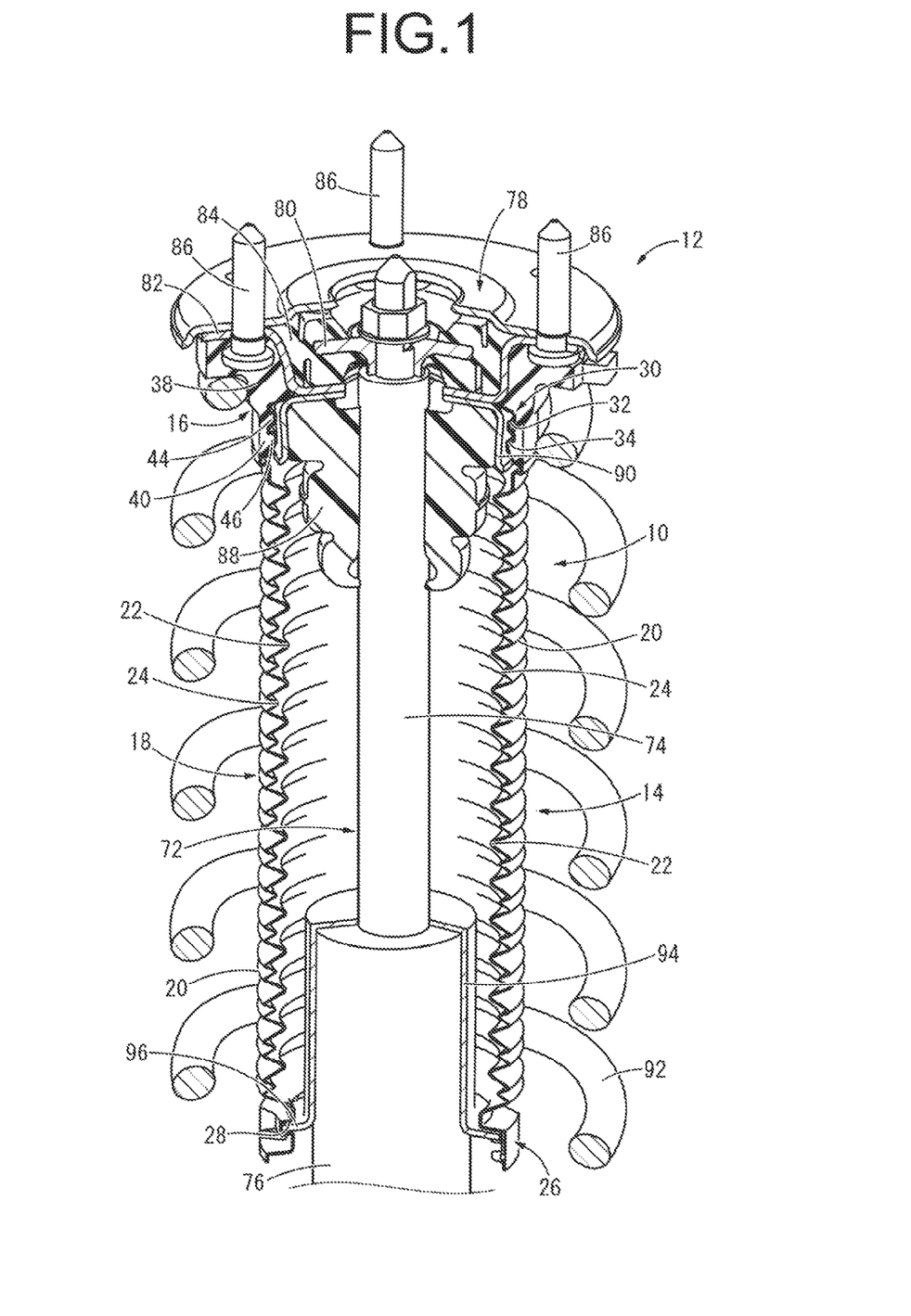
FIG. 1 is a perspective cross sectional view of a dust cover assembly as a first embodiment of the present invention in a state of being mounted to a suspension mechanism.

FIG. 1 shows a dust cover assembly 10 as a first embodiment of the present invention in a state of being mounted to a suspension mechanism 12 for motor vehicles. The dust cover assembly 10 is provided with a dust cover 14 and an upper insulator 16. In the following descriptions, the up-down direction generally means the up-down direction in FIG. 1.

Figure 2:
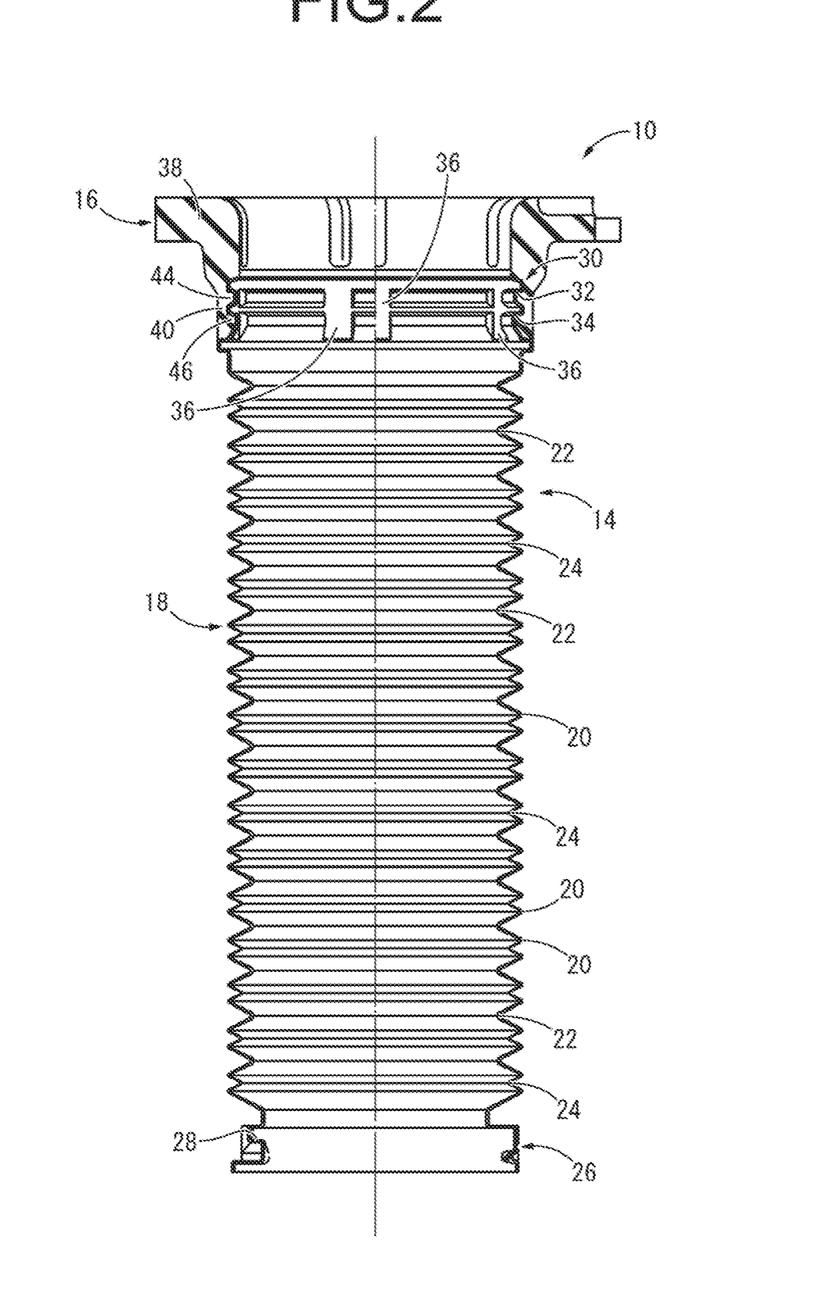
FIG. 2 is a longitudinal cross sectional view of the dust cover assembly shown in FIG. 1.

More specifically, the dust cover 14, as shown in FIG. 2, is in an approximate shape of a circular cylinder as a whole, and is formed of synthetic resin. The synthetic resin forming the dust cover 14 is not particularly limited, but in the present embodiment, a dispersed mixture of polypropylene (PP) as a thermoplastic resin and ethylene propylene diene monomer (EPDM) rubber is adopted because of its excellent weatherability and formability. However, in case of forming the dust cover 14 with thermoplastic resin, various thermoplastic elastomers can all be adopted such as polyolefin-based resin including polypropylene and polyethylene, polyamide-based resin, polyvinyl chloride-based resin, polyester-based resin, urethane-based resin, styrene-based resin, and olefin-based resin. Also, as a molding method of the dust cover 14, blow molding is preferably adopted, but injection molding is also adoptable.

Also, a bellows tube portion 18 is provided in the middle section of the dust cover 14 in the axial direction. The bellows tube portion 18 has a structure where peaks 20 extending annularly in the circumferential direction with an approximate V-shaped cross section rotated laterally which is convex outward and valleys 22, 24 extending annularly in the circumferential direction with an approximate V-shaped cross section rotated laterally which is concave outward are arranged alternately in a linked manner in the axial direction. In addition, the valleys formed above and below each peak 20 are composed of a large valley 22 with a large depth and a small valley 24 with a small depth, and the innermost edges of the large valley 22 and the small valley 24 are located at shifted positions in the radial direction.

In addition, a mating tube portion 26 is integrally formed with the bellows tube portion 18 on its bottom side. The mating tube portion 26 is in an approximate shape of a circular cylinder and is provided with a peripheral groove 28 that opens to the inner peripheral face.

Furthermore, on the upper side of the bellows tube portion 18, an engaging tube portion 30 is integrally formed. The engaging tube portion 30 is in an approximate shape of a circular cylinder and is provided with a first engaging groove 32 and a second engaging groove 34. The first engaging groove 32 and the second engaging groove 34 are concave grooves each opening onto the outer peripheral face extending in the circumferential direction, and the first engaging groove 32 is arranged above the second engaging groove 34 at a given distance in the axial direction. In the present embodiment, the lower wall of the second engaging groove 34 slopes down at relatively a small angle to the axial direction, and the dimension in the axial direction of the opening of the second engaging groove 34 is made larger than that of the first engaging groove 32.

Moreover, the first engaging groove 32 and the second engaging groove 34 are provided with abutting parts 36 at a plurality of locations along the circumference. The abutting part 36 protrudes toward the inner circumference from the engaging tube portion 30 within the first engaging groove 32 and the second engaging groove 34. This allows the first engaging groove 32 and the second engaging groove 34 of the present embodiment to be divided by the abutting part 36 in the circumferential direction, and in the present embodiment, six each of these abutting parts 36 are formed on the circumference of the engaging grooves 32, 34, which are each divided into six sections along the circumference. In the present embodiment, the abutting part 36 of the first engaging groove 32 and the abutting part 36 of the second engaging groove 34 are formed approximately at the same position in the circumferential direction.

Figure 3:
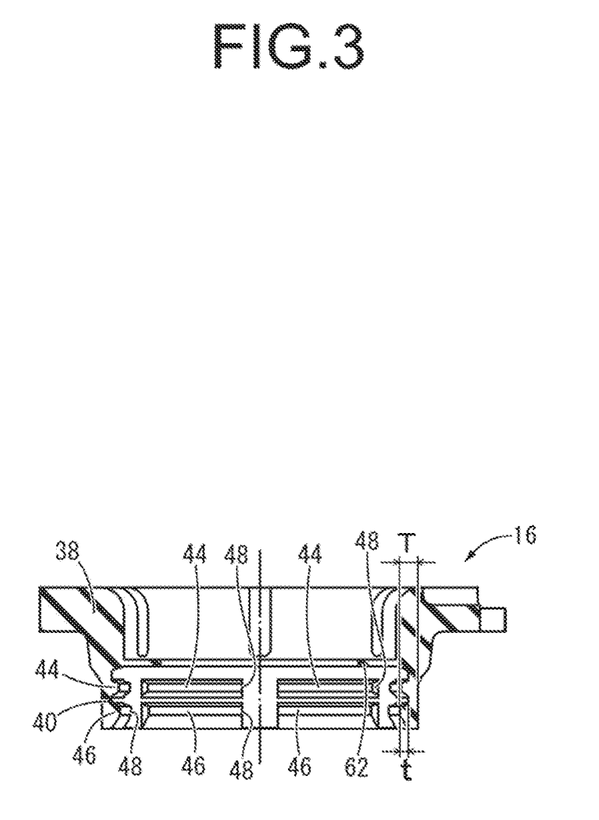
FIG. 3 is a longitudinal cross sectional view of an upper insulator constituting the dust cover assembly shown in FIG. 2 prior to the assembly to a dust cover.

Also, the engaging tube portion 30 constituting the upper end of the dust cover 14 is mounted to the upper insulator 16. The upper insulator 16, as shown in FIG. 3, is a rubber elastic body in an approximate annular shape as a whole, and is integrally provided with a spring support portion 38 and a cylindrical portion 40. The spring support portion 38 in an annular shape is provided with an inner peripheral portion in a cylindrical shape extending in the up-down direction and an outer peripheral portion that protrudes outward from the top end of the inner peripheral portion.

In addition, the spring support portion 38 is integrally formed with the cylindrical portion 40 protruding downward. The cylindrical portion 40 protrudes from the inner peripheral edge of the spring support portion 38 where a first locking protrusion 44 and a second locking protrusion 46 are provided to protrude from its inner peripheral face. The first locking protrusion 44 and the second locking protrusion 46 are each protruding toward the inner peripheral side from the cylindrical portion 40 extending in the circumferential direction, and the first locking protrusion 44 is arranged above the second locking protrusion 46 at a given distance in the axial direction. Also, both the first locking protrusion 44 and the second locking protrusion 46 gradually decrease their widths toward the protrusion tip to narrow down in the axial direction.

Furthermore, the first locking protrusion 44 and the second locking protrusion 46 protrude toward the inner circumference by approximately the same dimension 't,' and this protruding dimension 't' of the first and second locking protrusions 44, 46 is set relative to the maximum thickness dimension 'T' of the cylindrical portion 40 which is the formation part of the first and second locking protrusions 44, 46 in the range of $T/4 \leq t \leq 3T/4$. This is because, if the protruding dimension 't' of the first and second locking protrusions 44, 46 is too small relative to the maximum thickness 'T' of the cylindrical portion 40, the engagement margin (abutting area) between the first and second engaging grooves 32, 34 and the first and second locking protrusions 44, 46 in the axial direction (described later) gets too small, which makes it hard to obtain enough fixing strength between the dust cover 14 and the upper insulator 16. On the contrary, if the protruding dimension 't' of the first and second locking protrusions 44, 46 is too large relative to the maximum thickness 'T' of the cylindrical portion 40, the cylindrical portion 40 gets too thin to subject itself to deformation rather easily, which results in insufficient fixing strength of the fitting between the cylindrical portion 40 and the engaging tube portion 30, which will be described later. The protruding dimension 't' of the first and second locking protrusions 44, 46 relative to the maximum thickness 'T' of the cylindrical portion 40 is more preferably set in the range of $T/3 \leq t \leq 2T/3$, and in the present embodiment, the value of 't' is approximately set at $t=T/2$.

Moreover, on the circumferences of the first locking protrusion 44 and the second locking protrusion 46, a dividing groove 48 is formed. The dividing groove 48 is a concave groove that opens to the inner peripheral face of the cylindrical portion 40 while extending in the axial direction, and the first locking protrusion 44 and the second locking protrusion 46 are divided in the circumferential direction by the dividing groove 48. The dividing groove 48 is formed at a plurality of locations along each circumference of the first locking protrusion 44 and the second locking protrusion 46, and the first and second locking protrusions 44, 46 are divided in the circumferential direction across each of these dividing grooves 48, and in the present embodiment, the locking protrusions 44, 46 are each divided into six sections in the circumferential direction by six of these dividing grooves 48. In the present embodiment, the dividing groove 48 of the first locking protrusion 44 and the dividing groove 48 of the second locking protrusion 46 are formed at approximately the same position along the circumference. Each dividing groove 48 is formed with a circumferential width approximately corresponding to that of the abutting part 36, and is arranged to be distributed at a location corresponding to the abutting part 36 on the circumference.

The dust cover 14 and the upper insulator 16 with the structures described above are attached to each other by having the engaging tube portion 30 fitted to the cylindrical portion 40. That is, the engaging tube portion 30 of the dust cover 14 is inserted into the cylindrical portion 40 of the upper insulator 16, while the first locking protrusion 44 and the second locking protrusion 46 of the cylindrical portion 40 are fitted to the first engaging groove 32 and the second engaging groove 34 that open to the outer peripheral face of the engaging tube portion 30. This allows the first and second locking protrusions 44, 46 and the first and second engaging grooves 32, 34 to be locked therein in the axial direction, and the engaging tube portion 30 to be fitted to the cylindrical portion 40, thereby constituting the dust cover assembly 10.

According to the dust cover assembly 10 with the structure described above, the rubber-made upper insulator 16 can easily be assembled to the resin-made dust cover 14.

In addition, by fitting the first and second locking protrusions 44, 46 provided in the cylindrical portion 40 of the upper insulator 16 to the first and second engaging grooves 32, 34 provided in the engaging tube portion 30 of the dust cover 14 so as to be locked therein in the axial direction, the dust cover 14 and the upper insulator 16 are firmly assembled in a non-adhesive manner.

Furthermore, in the present embodiment, the first and second engaging grooves 32, 34 and the first and second locking protrusions 44, 46 are provided to be spaced apart from each other up and down in the axial direction. Therefore, between the dust cover 14 and the upper insulator 16, the resistance to dislodgement of the dust cover 14 is exerted more firmly due to the locking between the first and second engaging grooves 32, 34 and the first and second locking protrusions 44, 46, thus more effectively preventing the dislodgement of the dust cover 14 from the upper insulator 16.

Moreover, in the present embodiment, a plurality of abutting parts 36 that divide the first and second engaging grooves 32, 34 are provided, while a plurality of dividing grooves 48 that divide the first and second locking protrusions 44, 46 along the circumference are formed, whereas the abutting part 36 is fitted to the dividing groove 48 to be locked therein in the circumferential direction. This allows the moving edges of the first and second locking protrusions 44, 46 within the first and second engaging grooves 32, 34 to be regulated by the abutment of the abutting part 36 against the dividing groove 48 in the circumferential direction, thus limiting the relative rotation of the dust cover 14 against the upper insulator 16. Therefore, the directional position of the dust cover 14 relative to the upper insulator 16 in the circumferential direction can easily be set, while the dust cover 14 and the upper insulator 16 can be held in the preset directions.

In the dust cover assembly 10, the assembly of the dust cover 14 and the upper insulator 16 can be carried out at the time of blow molding of the dust cover 14. Manufacturing method of the dust cover assembly 10 will be described below as an example.

Figure 4:
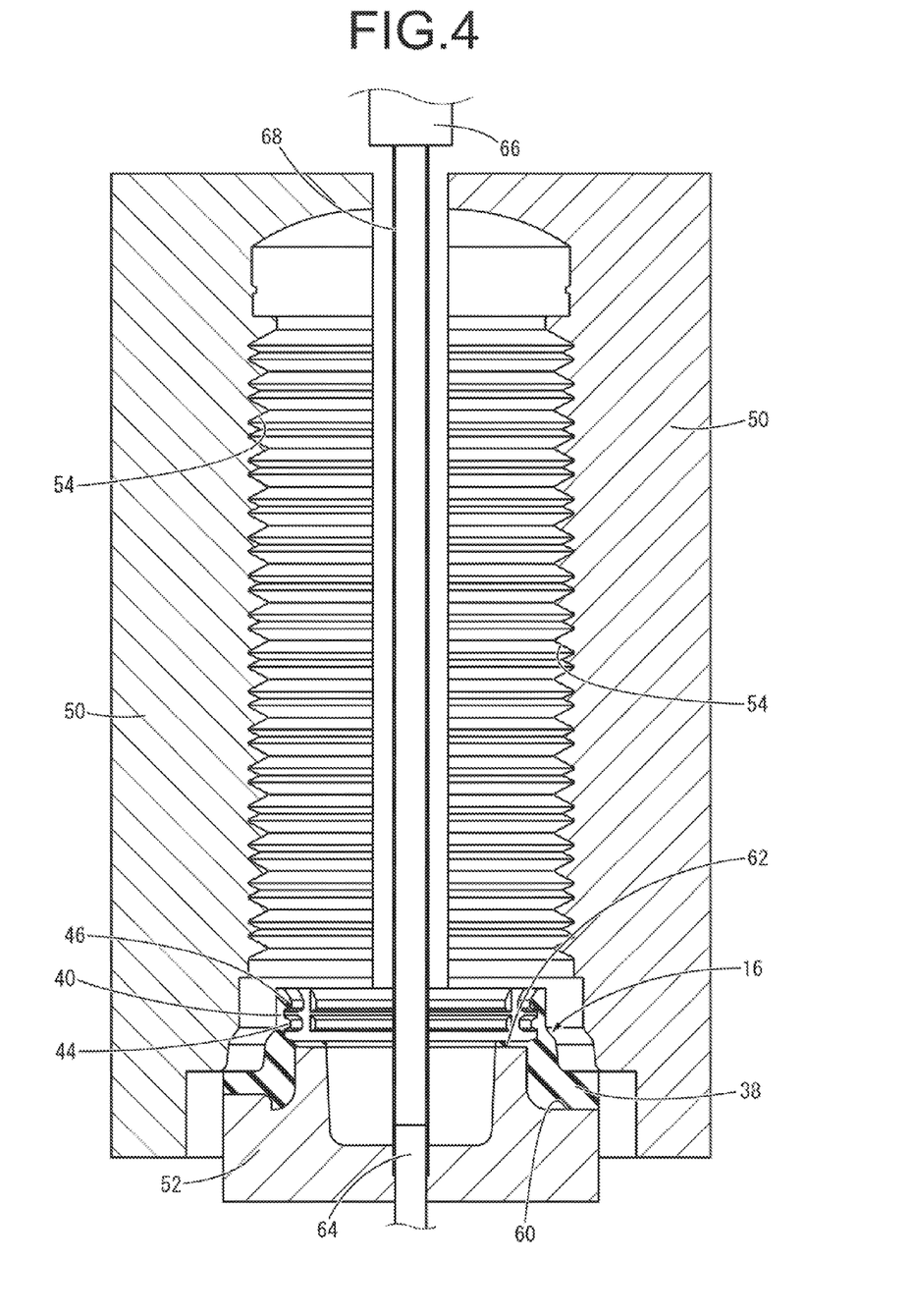
FIG. 4 is a longitudinal cross sectional view suitable for explaining the manufacturing process of the dust cover assembly shown in FIG. 2, representing a condition prior to mold closing.

First of all, as shown in FIG. 4, a pair of left and right blow molds 50, 50 as well as a molding jig 52 are prepared, and the upper insulator 16 formed in advance by vulcanization molding is set into the molding jig 52.

The blow mold 50 is provided with a half molding surface 54 in a shape corresponding to the outer peripheral face of the dust cover 14, and by combining a pair of blow molds 50, 50 facing each other, a cavity 56 is formed between these blow molds 50, 50, while the inner face of the cavity 56 turns out to be a cavity forming surface 58 composed of the half molding surfaces 54, 54.

The molding jig 52 is in an approximate shape of a bottomed circular cylinder, and the top face of the peripheral wall is made into a support surface 60 in a shape corresponding to the top face of the upper insulator 16, and the upper insulator 16 can be placed upside down on the support surface 60. In addition, on the base side of the cylindrical portion 40 of the upper insulator 16, a protective piece 62 in an inner flange shape is integrally formed, and by overlapping the protective piece 62 with the inner peripheral edge of the support surface 60, the support surface 60 is entirely covered by the upper insulator 16. Also, in about the middle of the molding jig 52 in the radial direction, a blow pipe 64 is provided protruding upward, and by having the blow pipe 64 connected to an exterior air-pipe system, not shown, compressed air is supplied thereto via the blow pipe 64.

Then, a parison 68 formed in a cylindrical shape by extrusion from a die 66 after thermally softening the molding material of the dust cover 14 is inserted between the pair of blow molds 50, 50 placed apart from each other, which is externally fitted onto the blow pipe 64 fixed to the molding jig 52 at the bottom end thereof.

Next, the blow molds 50, 50 and the molding jig 52 are closed to form the cavity 56 between the blow molds 50, 50 and the molding jig 52. The molding jig 52 gets caught between the bottom edges of the blow molds 50, 50 to make the lower wall of the cavity 56.

Figure 5:
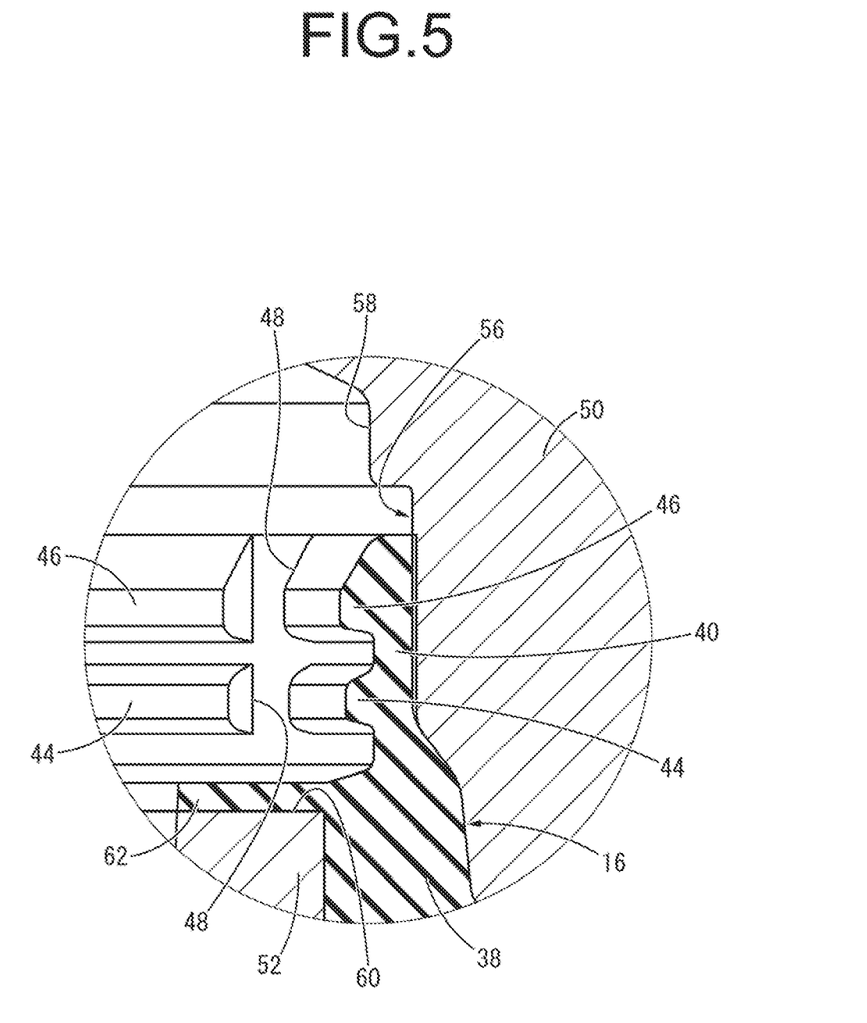
FIG. 5 is an enlarged cross sectional view of a principal part of FIG. 4.

Also, the upper insulator 16 placed upside down on the support surface 60 of the molding jig 52 is set in such a way that the cylindrical portion 40 protrudes into the cavity 56. In addition, the cylindrical portion 40 of the upper insulator 16 has its outer peripheral face overlapped with the blow molds 50, 50 to be restrained thereby, thus limiting the elastic deformation toward the outer periphery. In the present embodiment, as shown in the enlarged illustration of FIG. 5, the blow molds 50, 50 are arranged slightly outward from the outer peripheral face of the cylindrical portion 40 so that some elastic deformation of the cylindrical portion 40 is allowed toward the outer periphery although the amount of deformation is limited.

Figure 6:
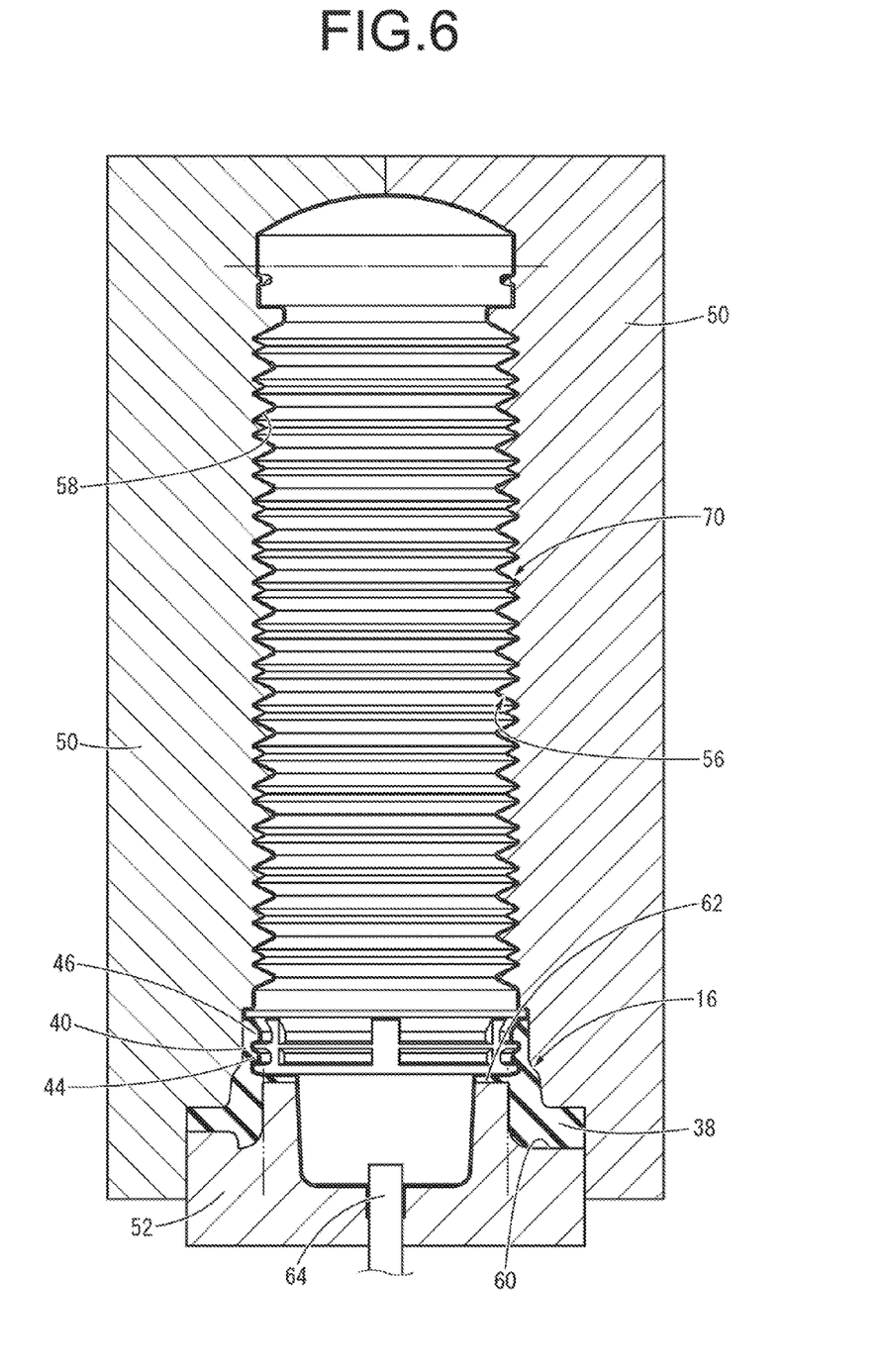
FIG. 6 is a longitudinal cross sectional view suitable for explaining the manufacturing process of the dust cover assembly shown in FIG. 2, representing a condition after blow molding and before mold opening.

Then, under a condition where the blow molds 50, 50 and the molding jig 52 are closed, parison 68 is deformed by air pressure to swell toward the outer periphery to be pressed against the cavity forming surface 58. This allows the parison 68, as shown in FIG. 6, to be formed into a thin cylindrical shape with its outer surface configuration corresponding to the cavity forming surface 58 so as to form a blow molded product 70 having the bellows tube portion 18 and the mating tube portion 26. By covering the inner peripheral end of the support surface 60 of the molding jig 52 by the protective piece 62 of the supper insulator 16, the protective piece 62 gets sandwiched between the parison 68 and the molding jig 52 at the time of swelling deformation of the parison 68, thus preventing any damage to the parison 68 caused by its abutment against corner edges of the molding jig 52.

Furthermore, by having the parison 68 deformed to swell by air pressure, the parison 68 is pressed against the inner peripheral face of the cylindrical portion 40 in the upper insulator 16. This allows the engaging tube portion 30 in a shape corresponding to the inner peripheral face of the cylindrical portion 40 to be formed by blow molding in a state of being fitted to the inner peripheral side of the cylindrical portion 40. At the same time, on the engaging tube portion 30, the first and second engaging grooves 32, 34 in a shape corresponding to the first and second locking protrusions 44, 46 provided in the cylindrical portion 40 are formed, while the first locking protrusion 44 is fitted to the first engaging groove 32 and the second locking protrusion 46 is fitted to the second engaging groove 34.

In addition, by forming the engaging tube portion 30 in a shape corresponding to the inner peripheral face of the cylindrical portion 40, the abutting part 36 is formed corresponding to the dividing groove 48 provided in the cylindrical portion 40 where the abutting part 36 fills up the dividing groove 48. This allows the abutting part 36 and the dividing groove 48 to be abutted and locked against each other in the circumferential direction, thus preventing relative rotation between the dust cover 14 and the upper insulator 16 about the central axis. The inner peripheral face of the abutting part 36 is smoothly continuous from the inner peripheral face of the engaging tube portion 30 away from the first and second engaging grooves 32, 34, and the groove on the inner peripheral side of the abutting part 36 is communicated with the space between the first engaging groove 32 and the second engaging groove 34 in the axial direction to make it easier to supply air thereto at the time of blow molding, thus enabling to achieve molding more rapidly and securely using the effect of air pressure.

As described above, the engaging tube portion 30 of the dust cover 14 is inserted into the upper insulator 16 at the time of blow molding of the dust cover 14, while the first and second locking protrusions 44, 46 are fitted to the first and second engaging grooves 32, 34 so as to form the dust cover 14 in a state of being assembled to the upper insulator 16. Therefore, according to the manufacturing method of the present embodiment, the process of assembling the dust cover 14 to the upper insulator 16 can be omitted, thus enabling to obtain the dust cover assembly 10 more easily.

Also, in the present embodiment, a gap is formed between the cylindrical portion 40 of the upper insulator 16 and the blow molds 50, 50 to allow the elastic deformation of the cylindrical portion 40 toward the outer periphery while the amount of deformation is restricted so that the engaging tube portion 30 is formed in a shape corresponding to the cylindrical portion 40 in a state of being spread out toward the outer periphery by air pressure at the time of blow molding. This allows the engaging tube portion 30 of the dust cover 14 to be fitted into the cylindrical portion 40 of the upper insulator 16 under a condition where the cylindrical portion 40 is elastically deformed toward the outer periphery, bringing the cylindrical portion 40 elastically in close contact with the engaging tube portion 30. Therefore, in the blow molded product 70, the inner peripheral face of the cylindrical portion 40 and the outer peripheral face of the engaging tube portion 30 are fitted to each other more firmly based on the elastic shape-restoring force of the cylindrical portion 40.

Since unnecessary parts are formed at both ends of the blow molded product 70 in the axial direction, the blow molded product 70 is to be cut along the two-dotted lines in FIG. 6 after being removed from the blow molds 50, 50, and once the unnecessary parts at both ends in the axial direction are removed, the dust cover assembly 10 is formed. At this time, in the present embodiment, the protective piece 62 of the upper insulator 16 is cut off together with each end of the blow molded product 70 in the axial direction after completion of the blow molding.

The dust cover assembly 10 formed in a way described above, as shown in FIG. 1, is mounted to the suspension mechanism 12 for motor vehicles. The suspension mechanism 12 has a piston rod 74 and a cylinder 76 constituting a shock absorber 72, and an upper support 78 is attached to the top end of the piston rod 74. The upper support 78 has a structure where an inner member 80 and an outer member 82 are elastically connected by a main rubber elastic body 84, and the inner member 80 is fixed to the top end of the piston rod 74, while the outer member 82 is mounted to the vehicular body, not shown, by a plurality of anchor bolts 86 installed in a protruding manner. In addition, a bound stopper 88 is externally fitted onto the piston rod 74. The bound stopper 88 is a cylindrical elastic body formed of urethane foam and the like, with its top end fitted to a cylindrical metal fitting 90 fixed to the outer member 82 of the upper support 78, while its bottom end protrudes downward from the cylindrical metal fitting 90. Furthermore, a coil spring 92 is externally fitted onto the shock absorber 72 being supported at the top end by the outer member 82 of the upper support 78, and supported at the bottom end by a lower spring sheet, not shown, that is fixed to the cylinder 76.

Also, the top end of the cylinder 76 has a cylinder cap 94 attached thereto. The cylinder cap 94, in an approximate shape of a reversed circular cylinder with a bottom, covers the top end of the cylinder 76, while at the bottom end, a locking hook 96 is integrally formed to protrude outward.

Then, the dust cover assembly 10 has the dust cover 14 externally fitted onto the shock absorber 72 of the suspension mechanism 12, being arranged so as to cover the protrusion of the piston rod 74 from the cylinder 76 in the shock absorber 72.

Furthermore, by having the upper insulator 16 overlapped with and attached to the outer member 82 of the upper support 78 attached to the top end of the piston rod 74, the upper part of the dust cover 14 above the bellows tube portion 18 is supported by the piston rod 74. Meanwhile, by having the locking hook 96 of the cylinder cap 94 inserted into the peripheral groove 28 that is provided in the mating tube portion 26 of the dust cover 14 and locked therein in the axial direction, the lower portion of the dust cover 14 below the bellows tube portion 18 is attached to the cylinder 76.

Moreover, in the present embodiment, the outer member 82 of the upper support 78 also works as an upper spring sheet so that the spring support portion 38 of the upper insulator 16 is overlapped with the outer member 82 from below to have the top end of the coil spring 92 supported by the outer member 82 via the spring support portion 38. In addition, due to the elasticity of the coil spring 92, the spring support portion 38 is pressed against the outer member 82 to have the upper insulator 16 attached thereto.

In addition, the cylindrical metal fitting 90 that supports the bound stopper 88 is arranged in the cylindrical portion 40 of the upper insulator 16 in an inserted state, and the first and second locking protrusions 44, 46 of the cylindrical portion 40 protrude toward the cylindrical metal fitting 90, and the fitting portion between the cylindrical portion 40 and the engaging tube portion 30 are located on the outer peripheral side of the cylindrical metal fitting 90. This restricts the displacement of the cylindrical portion 40 and the engaging tube portion 30 toward the inner circumference by virtue of the cylindrical metal fitting 90, allowing the cylindrical portion 40 and the engaging tube portion 30 to remain in a state of being stably fitted. In the present embodiment, the cylindrical metal fitting 90 is arranged spaced apart from the engaging tube portion 30 on the inner peripheral side.

In the mounted state of the dust cover assembly 10 to the suspension mechanism 12, since the dust cover 14 is supported by the piston rod 74 at the top end and by the cylinder 76 at the bottom end, the dust cover 14 always extends downward beyond the point where the piston rod 74 protrudes from the cylinder 76. Therefore, intrusion of dust from the bottom opening of the dust cover 14 and adherence thereof to the protrusion of the piston rod 74 can be effectively prevented. In addition, the bottom opening of the dust cover 14 has a small effective opening due to the locking hook 96 of the cylinder cap 94, which prevents intrusion of foreign matters more effectively.

Furthermore, the dust cover 14 supported at the top and bottom ends is made of resin, which ensures enough durability against tension. Also, even with a longitudinal structure where the length in the up-down direction is enough to prevent intrusion of foreign matters from the bottom opening, the bellows tube portion 18 is made thin enough by blow molding to allow high followability to the expansion and contraction of the shock absorber 72 so that any damage to the bellows tube portion 18 inflicted by compressive forces in the axial direction can be avoided. In addition, since the dust cover 14 is elastically supported by the rubber-made upper insulator 16, forces applied to the dust cover 14 are reduced by elastic deformation of the upper insulator 16, thus enhancing the durability of the dust cover 14.

Also, since the fitting portion between the dust cover 14 and the upper insulator 16 is located on the outer peripheral side of the cylindrical metal fitting 90 that supports the bound stopper 88, when the shock absorber 72 undergoes significant contraction by a shockingly large input, the fitting portion between the dust cover 14 and the upper insulator 16 is protected by the cylindrical metal fitting 90. Therefore, the forces applied to the fitting portion between the dust cover 14 and the upper insulator 16 get reduced, thereby preventing the dust cover 14 from dislodging from the upper insulator 16.

Embodiments of the present invention have been described in detail above, but the present invention is not limited to those specific descriptions. For example, in one of the above embodiments, the engaging groove was configured by the first engaging groove 32 and the second engaging groove 34 arranged up and down spaced apart in the engaging tube portion 30 of the dust cover 14, which were provided in two vertical rows, but the engaging groove can be provided in only one row, or in three or more rows vertically spaced apart. Similarly, the locking protrusion provided in the upper insulator does not necessarily have to be configured by the first locking protrusion 44 and the second locking protrusion 46, but the locking protrusion can be provided in one row or in three or more rows vertically spaced apart.

Furthermore, the engaging groove does not have to be divided by the abutting part 36 in the circumferential direction, but it can be a concave groove in an annular shape, for example, that goes all around the circumference. Similarly, the locking protrusion does not have to be divided by the dividing groove 48 in the circumferential direction, but it can be an annular protrusion, for example, that runs continuous all around the circumference.

Also, the engaging tube portion 30 of the dust cover 14 and the cylindrical portion 40 of the upper insulator 16 are preferably fitted to each other at the same time as the blow molding of the dust cover 14, as shown in one of the embodiments, but, for example, the dust cover 14 and the upper insulator 16 can be formed separately to be able to assemble the engaging tube portion 30 of the dust cover 14, after the molding thereof, to the cylindrical portion 40 of the upper insulator 16 by press-fitting or snap-fitting.

Also, the upper insulator 16 of one of the embodiments above is formed of a single rubber elastic body, but the displacement of the cylindrical portion 40 can be limited, for example, by means of embedding a cylindrical restraining member formed of a hard material into the cylindrical portion 40. This enables to enhance the fixing strength between the dust cover 14 and the upper insulator 16, while enabling to form the dust cover 14 by blow molding without restraining the outer peripheral face of the cylindrical portion 40 by the blow molds 50, 50.

What is claimed is:

1. A dust cover assembly comprising:
   a dust cover made of resin and configured to externally fit onto a shock absorber of a suspension mechanism, while including a bellows tube portion having peaks and valleys arranged in a linked manner, upper and lower sides of the bellows tube portion being configured to be supported by one and another of a piston rod and a cylinder of the shock absorber, respectively;
   an upper insulator made of rubber being overlapped with an upper support attached to a top end of the piston rod from below so as to support a top end of a coil spring of the suspension mechanism, the upper insulator being attached to a top end of the dust cover, and
   a bound stopper externally fitted onto the piston rod with its top end fitted into a cylindrical metal fitting, the cylindrical metal fitting being fixed to the upper support so as to protrude downward from the upper support, while being arranged radially within the upper insulator, wherein
   an engaging tube portion is integrally formed with an upper part of the bellows tube portion of the dust cover,
   at least one engaging groove opens onto an outer peripheral face of the engaging tube portion and extends in a circumferential direction,
   at least one locking protrusion is formed on an inner peripheral face of the upper insulator having an annular shape and protrudes toward an inner peripheral side, while extending in the circumferential direction,
   the engaging tube portion of the dust cover is inserted into the upper insulator, while the locking protrusion is inserted into the engaging groove and is locked therein in an axial direction,
   the dust cover is elastically supported directly by the upper insulator via a fitting portion by means of the engaging groove and the locking protrusion between the dust cover and the upper insulator, and the fitting portion between the dust cover and the upper insulator is located on an outer peripheral side of the cylindrical metal fitting with a gap therebetween.

2. The dust cover assembly according to claim 1, wherein the engaging groove includes an abutting part that regulates a moving edge of the locking protrusion within the engaging groove by abutting against the locking protrusion in the circumferential direction.

3. The dust cover assembly according to claim 1, wherein the at least one engaging groove formed in the engaging tube portion comprises a plurality of engaging grooves that are spaced apart from each other vertically in the axial direction, while the at least one locking protrusion formed on the upper insulator comprises a plurality of locking protrusions that are spaced apart from each other vertically in the axial direction.

4. The dust cover assembly according to claim 1, wherein in a formation part of the locking protrusion on the upper insulator, a protruding dimension (t) of the locking protrusion relative to a maximum thickness dimension (T) of the upper insulator including the locking protrusion in an axis-perpendicular direction is set in a range of $T/4 \leq t \leq 3T/4$.

5. The dust cover assembly according to claim 1, wherein the engaging tube portion of the dust cover is fitted into the upper insulator in a condition where the upper insulator is elastically deformed toward an outer periphery so as to be elastically brought in close contact with the engaging tube portion.

6. A manufacturing method of the dust cover assembly according to claim 1, comprising:

setting the upper insulator into a blow mold for molding the dust cover; and blow molding the dust cover within a molding jig such that the engaging tube portion of the dust cover is formed by blow molding at the inner peripheral side of the upper insulator, so that the engaging tube portion is fitted to the inner peripheral face of the upper insulator while the locking protrusion is locked in the engaging groove in the axial direction during the molding of the engaging tube portion.

7. The manufacturing method according to claim 6, wherein during the blow molding of the dust cover, a protective piece of the upper insulator is sandwiched between the blow mold of the dust cover and a parison of a molding material of the dust cover, and the protective piece is cut off after the molding of the dust cover.

* * * * *